US007830317B2

(12) United States Patent
Yamazaki (10) Patent No.: US 7,830,317 B2
(45) Date of Patent: Nov. 9, 2010

(54) ELECTRONIC APPARATUS (75) Inventor: Fuminori Yamazaki, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 146 days.

(21) Appl. No.: 12/338,777

(22) Filed: Dec. 18, 2008

(65) Prior Publication Data
US 2009/0322625 A1 Dec. 31, 2009

(30) Foreign Application Priority Data
Jun. 30, 2008 (JP) ............... 2008-170171

(51) Int. Cl.
*H01Q 1/24* (2006.01)
(52) U.S. Cl. .................. 343/702
(58) Field of Classification Search ............... 343/702, 343/700 MS, 725, 767, 850–855
See application file for complete search history.

(56) References Cited
U.S. PATENT DOCUMENTS

| 6,856,294 | B2 * | 2/2005 | Kadambi et al. | 343/702 |
| 7,595,759 | B2 * | 9/2009 | Schlub et al. | 343/702 |
| 2008/0231521 | A1 * | 9/2008 | Anguera Pros et al. | 343/702 |
| 2010/0073242 | A1 * | 3/2010 | Ayala Vazquez et al. | 343/702 |
| 2010/0156741 | A1 * | 6/2010 | Vazquez et al. | 343/846 |

FOREIGN PATENT DOCUMENTS

| JP | 10-13287 | 1/1998 |
| JP | 11-298223 | 10/1999 |
| JP | 2000-188506 | 7/2000 |
| JP | 2003-078333 | 3/2003 |
| JP | 2005-039797 | 2/2005 |
| JP | 2007-049644 | 2/2007 |
| JP | 2007-307722 | 11/2007 |
| WO | 2007/058230 A1 | 5/2007 |

OTHER PUBLICATIONS

Notice of Reason for Rejection with English translation in a corresponding Japanese application, application No. 2008-170171 dated Apr. 27, 2009.

* cited by examiner

*Primary Examiner*—Huedung Mancuso
(74) *Attorney, Agent, or Firm*—Blakely, Sokoloff, Taylor & Zafman LLP (57) ABSTRACT

According to one embodiment, an antenna incorporated in an electronic apparatus includes an antenna element formed of a metal thin film and provided on the inner surface of a side wall of a housing, an antenna ground formed of a metal thin film and provided on the inner surface of the bottom wall of the housing, and a conductor portion formed of a metal thin film, provided at least on the inner surface of the bottom wall and connecting the antenna element to the antenna ground. The feed pin of a feed terminal mounted on a printed circuit board is kept in contact with the conductor portion on the bottom wall to feed power from a wireless module to the antenna.

6 Claims, 8 Drawing Sheets

ELECTRONIC APPARATUS

CROSS-REFERENCE TO RELATED APPLICATIONS

This application is based upon and claims the benefit of priority from Japanese Patent Application No. 2008-170171, filed Jun. 30, 2008, the entire contents of which are incorporated herein by reference.

BACKGROUND

1. Field

One embodiment of the invention relates to an electronic apparatus having a wireless communication function, such as a notebook portable computer or PDA.

2. Description of the Related Art

Jpn. Pat. Appln. KOKAI Publication No. 2000-188506, for example, discloses a mobile communication apparatus as an electronic apparatus having a wireless communication function. The mobile communication apparatus contains an antenna device in which a ground pattern element and a reactance element are mounted on a printed circuit board, and they are connected to each other by a conductive pattern element.

The conductive pattern element is formed as a microstrip line for power supply, and has an end thereof connected to a meandering conductor that is connected to the reactance element, and the other end connected to a transceiver. Namely, on the printed circuit board, the rectangular reactance element and the transceiver are mounted.

Therefore, in the above-mentioned mobile communication apparatus, the mounting space on the printed circuit of the antenna device has a low degree of freedom in design. Further, the reactance element has a structure in which the meandering conductor is provided in a substrate formed of an insulating material. The substrate is considered not to be inherently necessary for the antenna device. The unnecessary, in a meaning, element increases the required raw material cost and the size of the apparatus.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an antenna 17 incorporated in a portable computer 11 comprises an antenna element 34 formed of a metal thin film and provided on the inner surface of a side wall 19B of a cover 19; an antenna ground 35 formed of a metal thin film and provided on the inner surface of the bottom wall 19A of the cover 19; and a conductor portion 36 formed of a metal thin film, provided at least on the inner surface of the bottom wall 19A, and connecting the antenna element 34 to the antenna ground 35. The feed pin 42 of a feed terminal 40 mounted on a printed circuit board 41 is kept in contact with the conductor portion 36 on the bottom wall 19A to feed power from a wireless module to the antenna 17.

Figure 1:
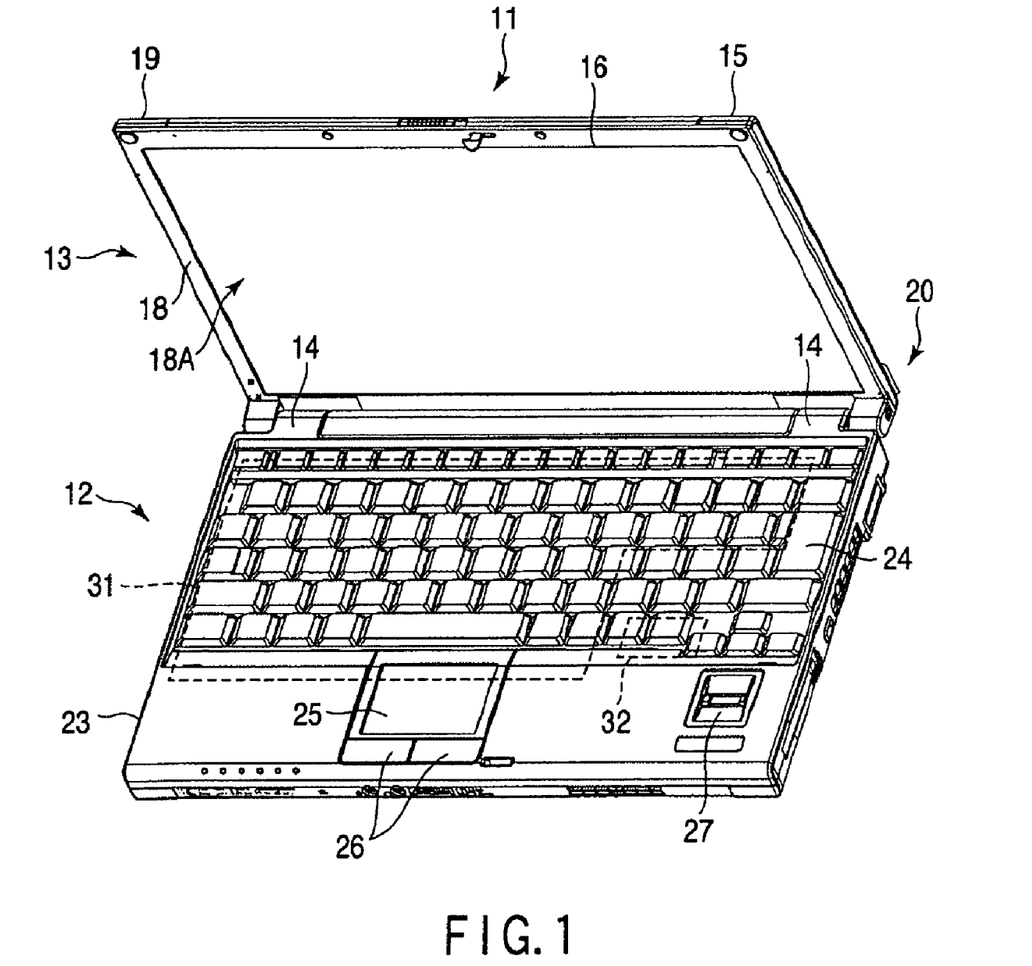
FIG. 1 is a perspective view of a portable computer according to a first embodiment of the invention.
Figure 2:
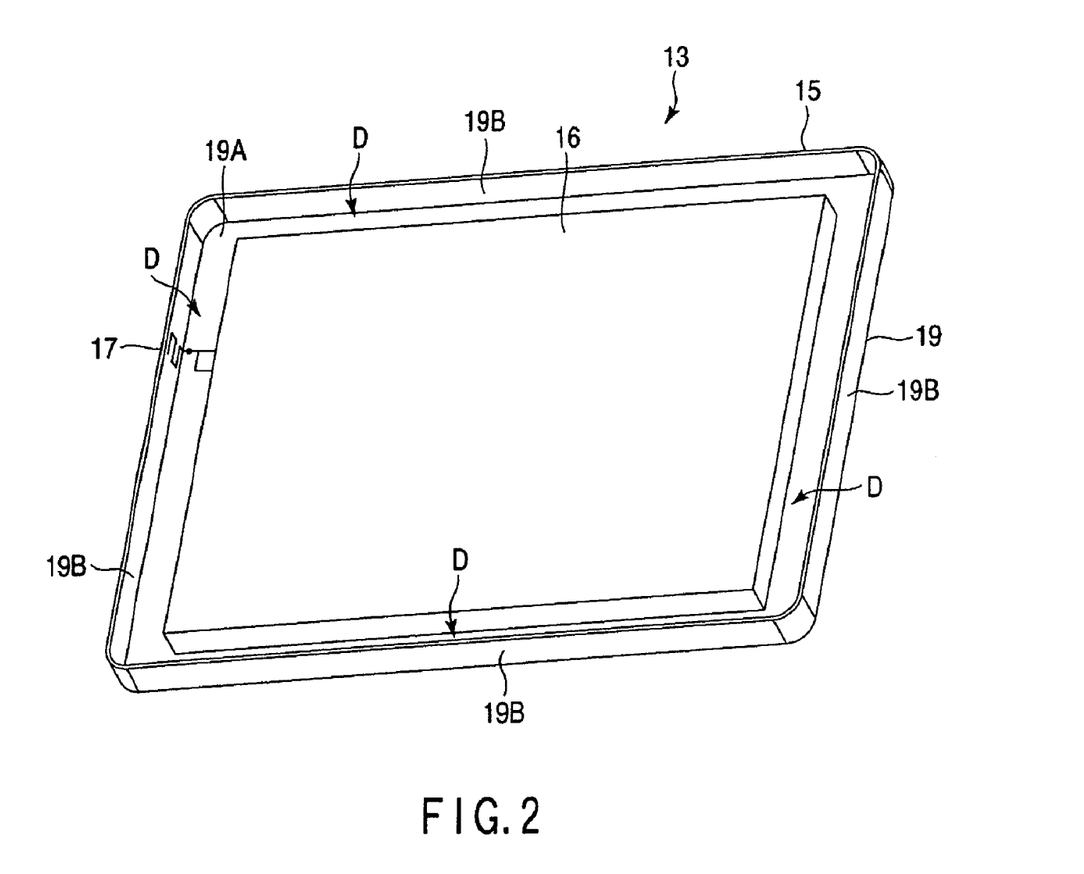
FIG. 2 is a perspective view useful in explaining the position of a liquid crystal display 16 with respect to the display cabinet of the portable computer shown in FIG. 1.
Figure 3:
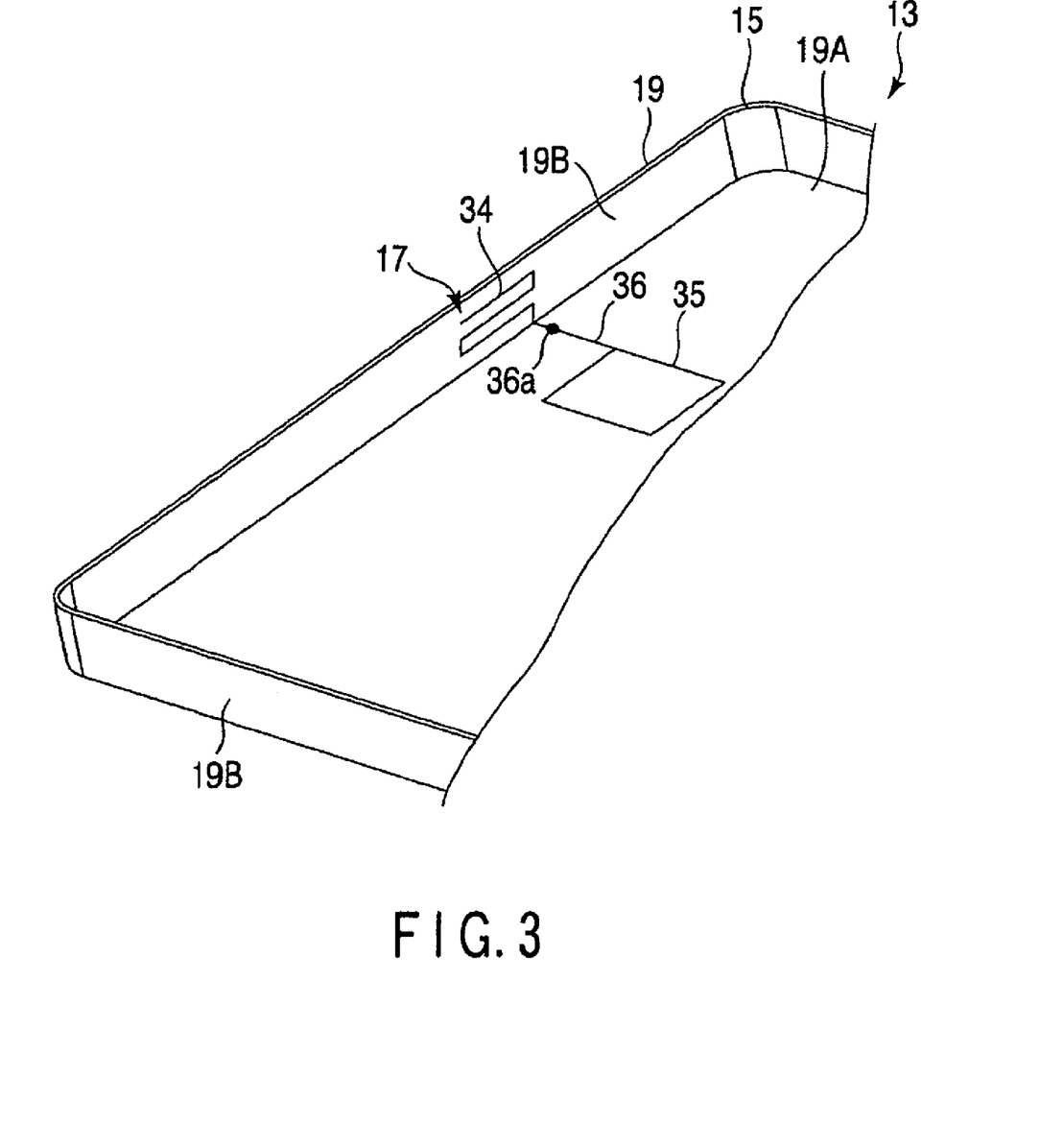
FIG. 3 is a partially enlarged perspective view useful in explaining the shape of an antenna formed on the inner surface of the case shown in FIG. 2.

Referring now to FIGS. 1 to 3, an electronic apparatus according to a first embodiment will be described. In this embodiment, the invention is applied to a portable notebook PC (personal computer) 11 as an example of the electronic apparatus.

As shown in FIG. 1, the portable PC 11 comprises a main unit 12, a display unit 13, and hinges 14 interposed therebetween. Each hinge 14 attaches the display unit 13 to the main unit 12 so that the units are rotatable relative to each other. Namely, the display unit 13 is rotatable between a position in which the units 12 and 13 are closed, and a position in which it is open to expose the main unit 12.

As shown in FIGS. 1 to 3, the display unit 13 comprises a display cabinet 15, a substantially rectangular liquid crystal display 16 received in the display cabinet 15, and a plurality of antennas provided on the inner surface of the display cabinet 15. Although FIGS. 2 and 3 show only a single antenna 17 for facilitating explanation, a plurality of antennas 17 may be employed.

The display cabinet 15 is formed of, for example, a synthetic resin. The display cabinet 15 is an assembly of a mask frame 18 (second housing) provided at the front side of the liquid crystal display 16, and a cover 19 (first housing) provided at the rear side of the liquid crystal display 16. In the first embodiment, the antenna 17 is formed on the inner surface of the cover 19.

The cover 19 includes a rectangular bottom wall 19A and side walls 19B. The mask frame 18 includes an opening 18A through which the front surface of the liquid crystal display 16 is exposed. The side walls 19B of the cover 19 extend from the periphery of the bottom wall 19A substantially perpendicularly. The mask frame 18 is attached to the upper end of each side wall 19B located away from the bottom plate 19A.

The liquid crystal display 16 is attached to the bottom wall 19A out of contact with the side walls 19B. Thus, a rectangular gap D is defined between the periphery of the liquid crystal display 16 and the side walls 19B. The liquid crystal display 16 includes a plurality of signal lines arranged in a lattice and having an electromagnetic radiation absorbing property. In the embodiment, to prevent electromagnetic radiation received by and transmitted from the antenna 17 from being adversely affected by the signal lines, the rectangular gap D is defined between the display 16, and the side walls 19B on which the antenna element 34 (described later) of the antenna 17 is formed.

The main unit 12 comprises a main unit cabinet 23, a keyboard 24, a touch pad 25 as a pointing device, buttons 26 and a finger-print recognition unit 27. The main unit cabinet 23 includes a conductive ground layer (not shown) formed on the inner surface thereof.

As shown in FIG. 1, the main unit cabinet 23 of the main unit 12 contains a printed circuit board 31, a plurality of electronic components mounted on the printed circuit board 31, and a wireless module (or modules) 32. The main unit 12 also comprises wiring lines (not shown) provided between itself and the display unit 13. The number of wireless modules 32 is equal to that of the antennas 17. The number of wiring lines is also equal to that of the antennas 17.

The wiring lines include coaxial cables extending between the main unit 12 and the display unit 13 via the hinges 14. Each coaxial cable has one end connected to the corresponding one of the wireless modules 32, and the other end connected to the corresponding one of the antennas 17 via a corresponding feed terminal 40 (described later). Namely, the wireless modules 32 in the main unit cabinet 23 are electrically connected to the antennas 17 in the display cabinet 15 via the coaxial cables.

The coaxial cable has a diameter of, for example, 0.8 mm, and is connected to a conductor portion 36 interposed between an antenna element 34 and an antenna ground 35 (which are described below). The main unit cabinet 23 and the display cabinet 15 constitute a housing 20.

As shown in FIG. 3, the antenna 17 is formed on the inner surface of the cover 19 of the display cabinet 15. More specifically, the antenna 17 is formed of a metal thin film and attached to the inner surface of the cover 19. The thin film antenna 17 comprises an antenna element 34 for mainly transmitting/receiving electromagnetic radiation, an antenna ground 35 for mainly broadening a radio frequency band, and a conductor portion 36 connecting the antenna element 34 to the antenna ground 35.

The antenna element 34 has a meandering pattern angled at several positions, and is formed on the inner surface of a side wall 19B of the cover 19 incorporated in the display cabinet 15. The antenna ground 35 is a rectangular conductor, and is formed on the inner surface of the bottom wall 19A of the cover 19. The conductor portion 36 is mainly formed on the inner surface of the bottom wall 19A of the cover 19 to connect the antenna element 34 to the antenna ground 35. In the first embodiment, the conductor portion 36 is formed on the inner surface of the bottom wall 19A of the cover 19, but part of the conductor portion 36 may be formed on the inner surface of a side wall 19B of the cover 19.

The antenna element 34, the antenna ground 35 and the conductor portion 36 are formed on inner surfaces of the cover 19 by, for example, printing (screen printing). In the embodiment, the antenna element 34, the antenna ground 35 and the conductor portion 36 are formed of copper, nickel and gold thin films stacked on each other by screen printing. The stacked structure has a thickness of, for example, 20 μm. The method of forming these elements is not limited to screen printing, but may be spray coating, vacuum chemical vapor deposition, sputtering, or their combinations.

Although FIG. 3 shows only a single antenna 17, a plurality of antennas 17 are actually provided on inner surfaces of the cover 19 of the display cabinet 15. These antennas 17 correspond to respective communication schemes, such as Bluetooth (trademark), wireless LAN, wireless WAN, WiMAX, UWB and GPS, and/or cellular phone schemes, such as 3G and 3.5G. Further, two patterned antennas may be formed on respective opposite side walls 19B of the cover 19, thereby providing a dipole antenna. The communication schemes that comply with the antennas 17 are not limited to the above-mentioned ones.

In the first embodiment, the cover 19 has side walls 19B, and the antenna element 34 of each antenna 17 is formed on one side wall 19B. Alternatively, the mask 18 may have a side wall on which the antenna element 34 of each antenna 17 is formed. Furthermore, although in the embodiment, the antennas 17 are formed on inner surfaces of the display cabinet 15, they may be formed on inner surfaces of the main unit cabinet 23.

As described above, in the first embodiment, since the antennas 17 are provided inside the housing 20, they are not seen from outside, which means that the outside appearance of the electronic apparatus is not degraded by the antennas. Further, since the antennas 17 are formed of metal thin films, they can be constructed with a small number of components, simple, small and light.

As a result, the space required for the antennas 17 can be minimized, thereby enabling the entire electronic apparatus to be made compact and light. Furthermore, since the space for the antennas 17 is minimized, a sufficient space for installing other electronic components can be secured to increase the degree of freedom of laying out the electronic components.

In addition, the step of attaching the antennas 17 can be omitted by forming the antennas 17 of metal thin films. In particular, it is not necessary to use a fixing tool, such as tape, for fixing the antennas 17, or to provide, on the display cabinet 15, a rib for fixing the antennas 17 thereon. As a result, the number of required components can be reduced.

Figure 4:
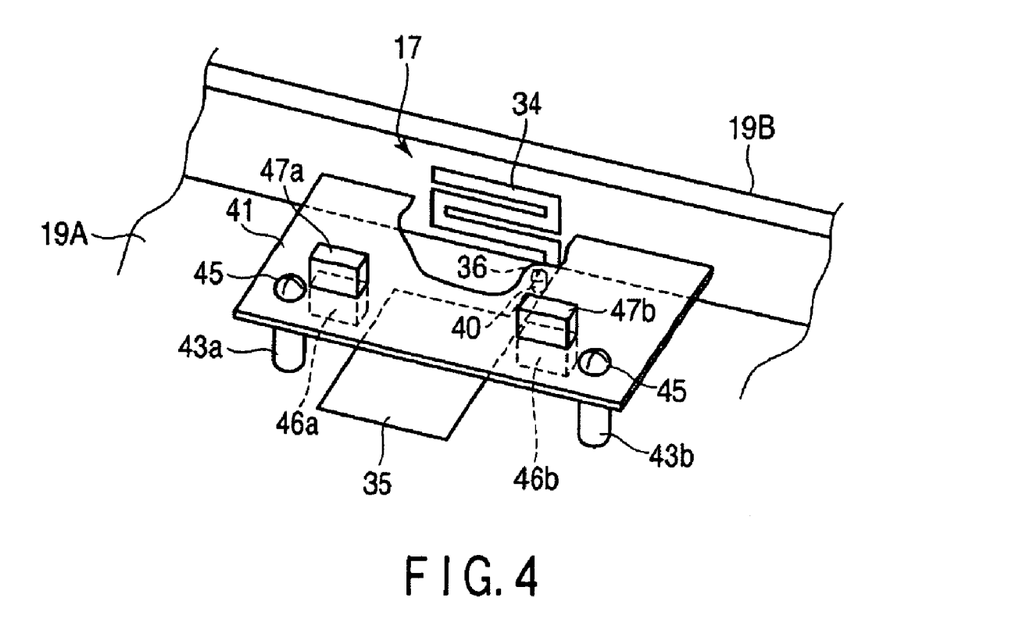
FIG. 4 is a schematic perspective view illustrating a power feed structure for the antenna shown in FIG. 3.
Figure 5:
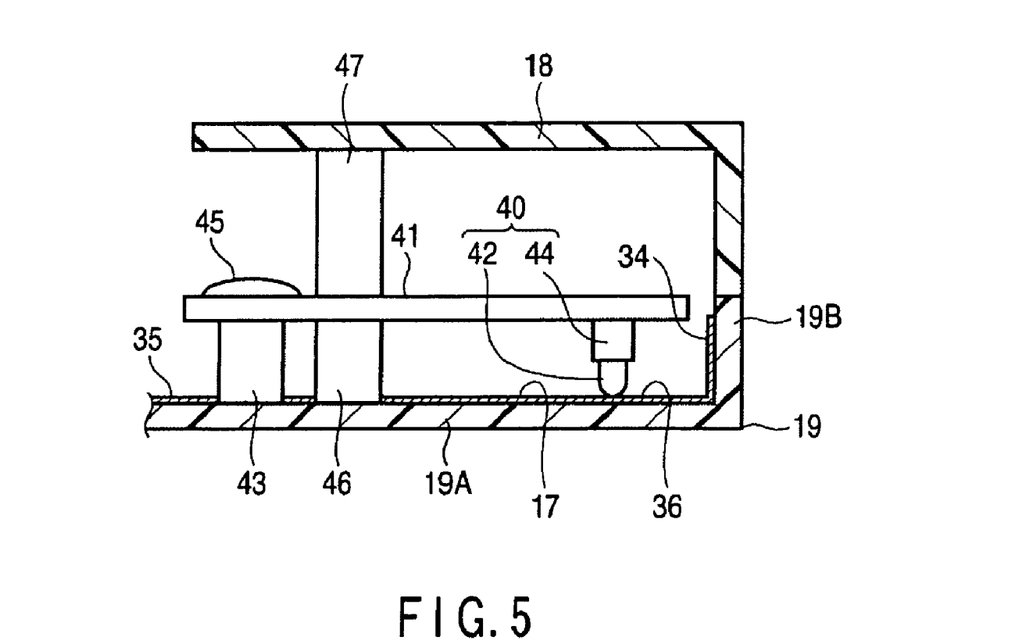
FIG. 5 is a sectional view of the power feed structure shown in FIG. 4.
Figure 6:
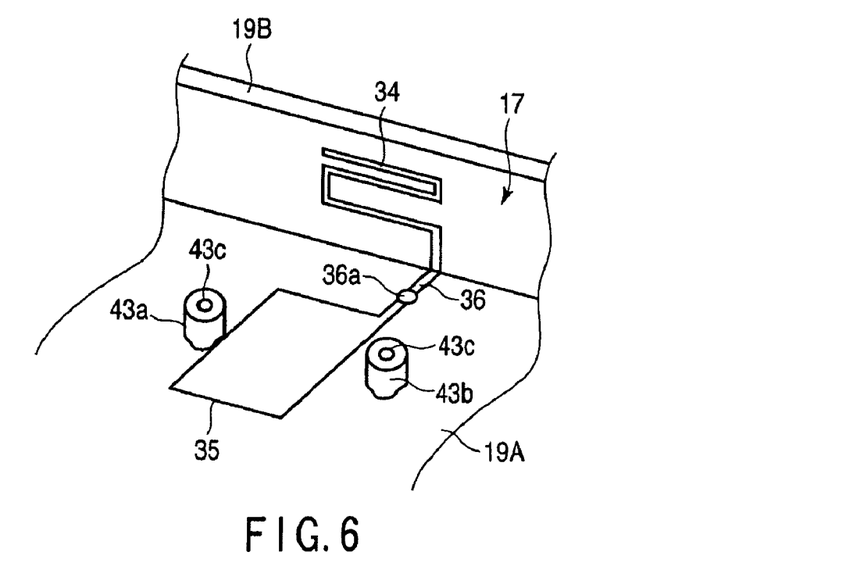
FIG. 6 is schematic perspective view illustrating a structure obtained by removing a printed circuit board from the structure of FIG. 4.

Referring then to FIGS. 4 to 6, a description will be given of a structure for feeding power to the antennas 17. FIG. 4 is a partially broken perspective view schematically illustrating the antenna 17 formed on the bottom wall 19A and one side wall 19B of the cover 19 of the display cabinet 15, and a power feed structure for the antenna 17. FIG. 5 is a schematic sectional view of the power feed structure of FIG. 4. FIG. 6 is a schematic perspective view illustrating a structure obtained by removing a printed circuit board 41 from the structure of FIG. 4.

The rectangular printed circuit board 41 is provided at a position near the side wall 19B and above the bottom wall 19A, substantially parallel to the bottom wall 19A. The rectangular printed circuit board 41 has a size with which it is received within the rectangular gap D defined between the liquid crystal display 16 and the side wall 19B, and is located within the gap D.

The rectangular printed circuit board 41 is fixed to the inner surface of the bottom wall 19A by two bosses 43a and 43b (FIG. 5 shows only one of them using reference number 43) projecting from the bottom wall 19A. The printed circuit board 41 and the bosses 43a and 43b cooperate to serve as a cantilever. Namely, one side portion of the printed circuit board 41 remote from the bosses 43a and 43b is a free side portion slightly separate from the side wall 19B, and can be slightly bent, using, as a fulcrum, the other side portion fixed by the bosses 43a and 43b.

Specifically, the lower surface of the side portion of the printed circuit board 41, which is remote from the side wall 19B, is brought into contact with the upper ends of the bosses 43a and 43b shown in FIG. 6, and is positioned to align screw holes (not shown) formed in that portion with screw holes 43c (FIG. 6) formed in the bosses 43a and 43b. In this state, screws 45 are screwed into the coaxially positioned screw holes from above the printed circuit board 41, thereby fixing the printed circuit board 41 to the bosses 43a and 43b. Thus, the two bosses 43a and 43b and the screws 45 serve as the fixing members of the present invention.

On the printed circuit board 41, a plurality of electronic components (not shown) are mounted, and the aforementioned feed terminal 40 to be pressed against the conductor portion 36 of the antenna 17 is mounted. As shown in FIG. 5, the feed terminal 40 comprises a feed pin 42 to be electrically connected to the conductor portion 36 of the antenna 17, and a holding sleeve 44.

The holding sleeve 44 downwardly projects from the lower surface of the free side portion (i.e., the side portion close to the side wall 19B) of the printed circuit board 41, the lower surface facing the bottom wall 19A. The holding sleeve 44 holds the feed pin 42 so that the feed pin 42 can axially protrude and retract, and urges the feed pin 42 to the conductor portion 36. Namely, a spring (not shown) urging the feed pin 42 is received in the holding sleeve 44.

Thus, by attaching the feed terminal 40 to the free side portion of the printed circuit board 41 that can be slightly bent, and providing the feed pin 42 elastically pressed against the conductor portion 36b by a spring force, the feed terminal 40 is elastically pressed against the conductor portion 36. By virtue of this structure, even when the cover 19 is vibrated, the feed pin 42 can follow the vibration, whereby the cover 19 and the feed pin 42 can be kept in reliable contact with each other.

Further, since the feed terminal 40 is attached to the free side portion of the printed circuit board 41 close to the side wall 19B, the feed pin 42 is made to contact the conductor portion 36 at a position close to the side wall 19B. This means that the feed point 36a (see FIG. 6) of the conductor portion 36 can be made close to the side wall 19B. Therefore, even when an external force is exerted on the cover 19, the contact between the feed point 36a of the conductor portion 36 and the feed pin 42 is prevented from being unstable. More specifically, when the portable computer 11 falls down on the floor or collides with something, the bottom wall 19A of the cover 19 is deformed. At this time, however, the degree of deformation is low at the portion of the bottom wall 19A close to the side wall 19B. By providing the feed point 36a on the portion of a low deformation degree, the tip of the feed pin 42 can be prevented from being separated from the feed point 36a. Thus, the contact therebetween is stabilized.

Furthermore, by providing the feed point 36a on the portion of a low deformation degree, the feed pin 42 is prevented from being scraped against the conductor portion 36 because of relative movement therebetween, thereby minimizing abrasion of the conductor portion 36 and maintaining a stable contact state for a long time.

In addition, for the above-mentioned reasons, it is desirable to set the pressure of contact of the feed pin 42 against the conductor portion 36 to an appropriate value. If the pressure of contact is too strong, the tip of the feed pin 42 may well peel off the conductor portion 36. In contrast, if the pressure of contact is too weak, contact therebetween may well be unstable. In the above-described structure, the pressure of contact is substantially determined based on the spring force of the holding sleeve 44 of the feed terminal 40, and the degree of bending of the printed circuit board 41. However, there is a slight factor that makes the pressure of contact unstable, such as a force of fastening the printed circuit board 41.

In light of this, in the first embodiment, two support walls 46a and 46b (first support members) (FIG. 5 shows only one of them using reference number 46) are each interposed between the feed terminal 40 and the two bosses 43a and 43b supporting the printed circuit board 41 in a cantilever state, and between the lower surface of the printed circuit board 41 and the bottom wall 19A of the cover 19. In other words, each of the two support walls 46a and 46b has its one end kept in contact with the bottom wall 19A and the other end kept in contact with the lower surface of the printed circuit board 41, thereby causing the bottom wall 19A to support the printed circuit board 41.

By positioning the two support walls 46a and 46b on appropriate portions of the bottom wall 19A, the pressure of contact of the feed pin 42 can be controlled to an appropriate value and stabilized. For instance, if the positions of the support walls 46a and 46b are shifted toward the side wall 19B between the bosses 43a, 43b and the feed terminal 40, the rigidity of the printed circuit board 41 against bending is enhanced to thereby reduce the degree of deformation due to bending. In contrast, if the positions of the support walls 46a and 46b are shifted toward the bosses 43a and 43b, the rigidity of the printed circuit board 41 against bending is reduced to thereby increase the degree of deformation due to bending.

As a result, even if variations occur in the fastening force of the screw 45, the pressure of contact of the feed pin 42 against the conductor portion 36 can be controlled appropriately, whereby it can be maintained at a desired value to eliminate variations in the pressure of contact between power feed structure products. In particular, in the first embodiment, as shown in FIGS. 4 and 5, support walls 47a and 47b (second support members) (FIG. 5 shows only one of them using reference number 47) are also provided between the inner surface of the mask 18 and the upper surface of the printed circuit board 41, which is opposite to the surface (lower surface) that the support walls 46a and 46b contact. Accordingly, the degree of deformation of the printed circuit board 41 can be controlled more reliably.

As described above, in the first embodiment, since the antennas 17 formed of metal thin films are provided on both the bottom wall 19A and side wall 19B of the cover 19, their installation areas are very small. As a result, the degree of freedom of laying out the electronic components is increased, and the entire electronic apparatus can be made simple, compact and light, whereby the manufacturing cost of the apparatus can be reduced. Further, since the feed terminal 40 mounted on the printed circuit board 41 is used as a power feed structure for the antennas 17, the portion of wiring exposed for power feeding can be minimized, which facilitates the attachment of the antennas.

Figure 7:
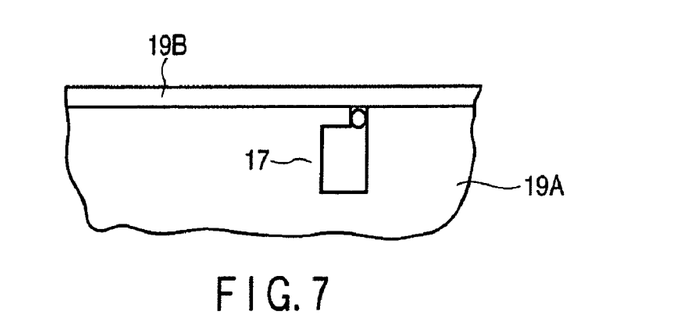
FIG. 7 is a plan view illustrating a state in which only a single antenna is formed near a side wall of the case.
Figure 8:
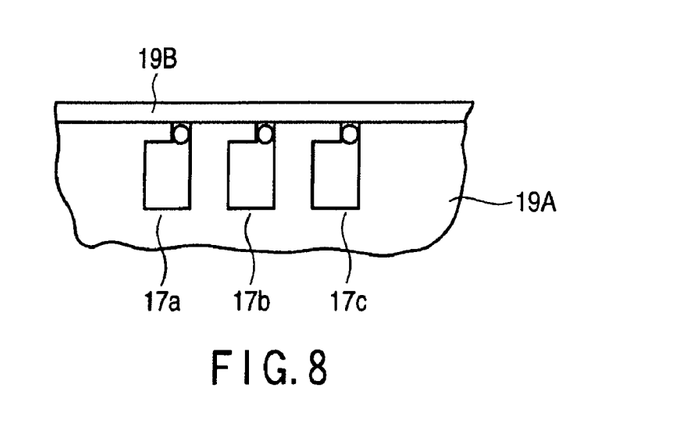
FIG. 8 is a plan view illustrating a state in which a plurality of antennas are formed near a side wall of the case.

When a plurality of antennas 17a, 17b and 17c are arranged along the side wall 19B as shown in FIG. 8, a plurality of feed terminals 40 for feeding the antennas 17a, 17b and 17c can be mounted in the single printed circuit board 41. Therefore, the entire apparatus can have a simpler structure, and be manufactured by a simpler process and hence at lower cost, than in the case of FIG. 7 where only a single antenna 17 is provided.

Figure 9:
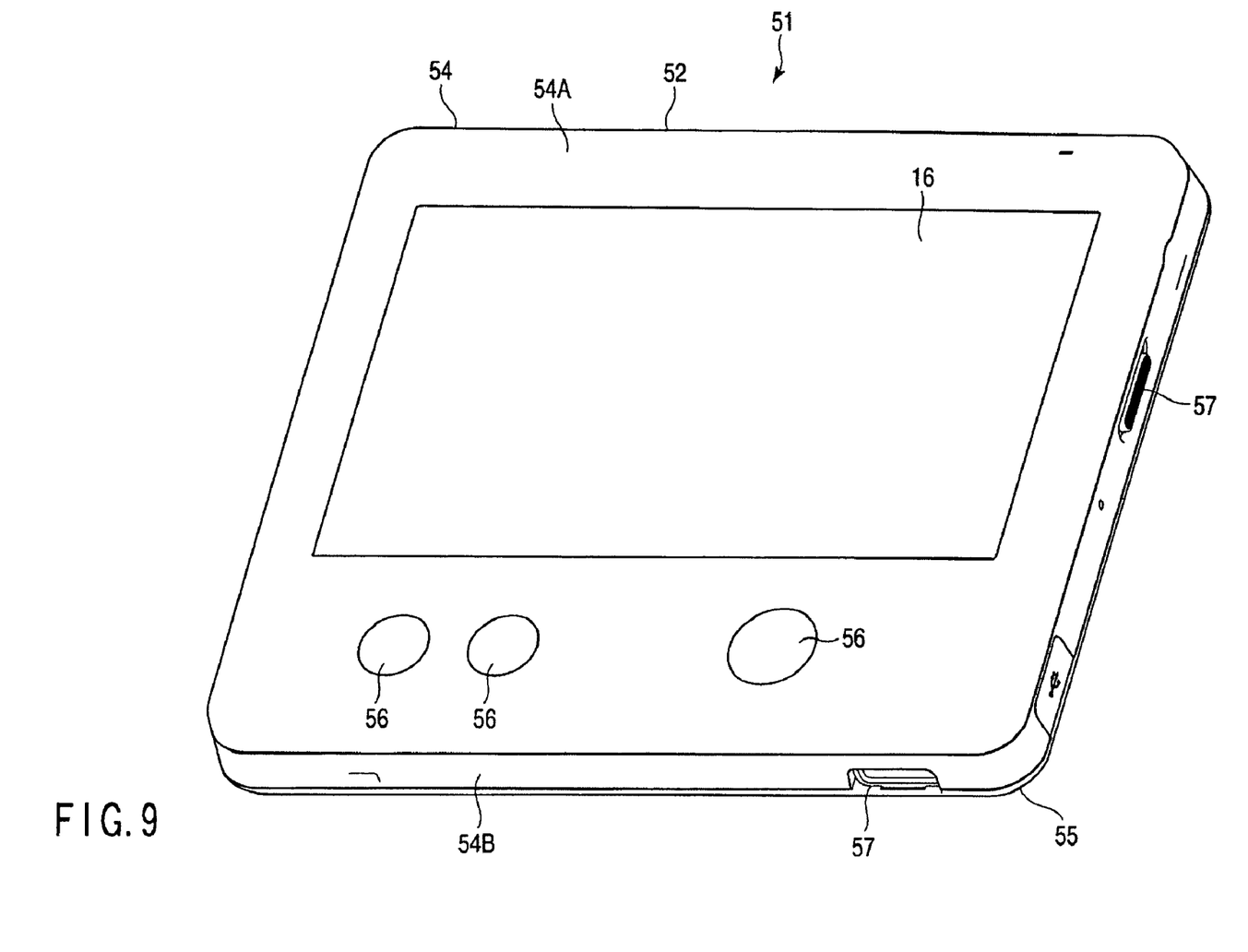
FIG. 9 is a perspective view of a portable computer according to a second embodiment of the invention.
Figure 10:
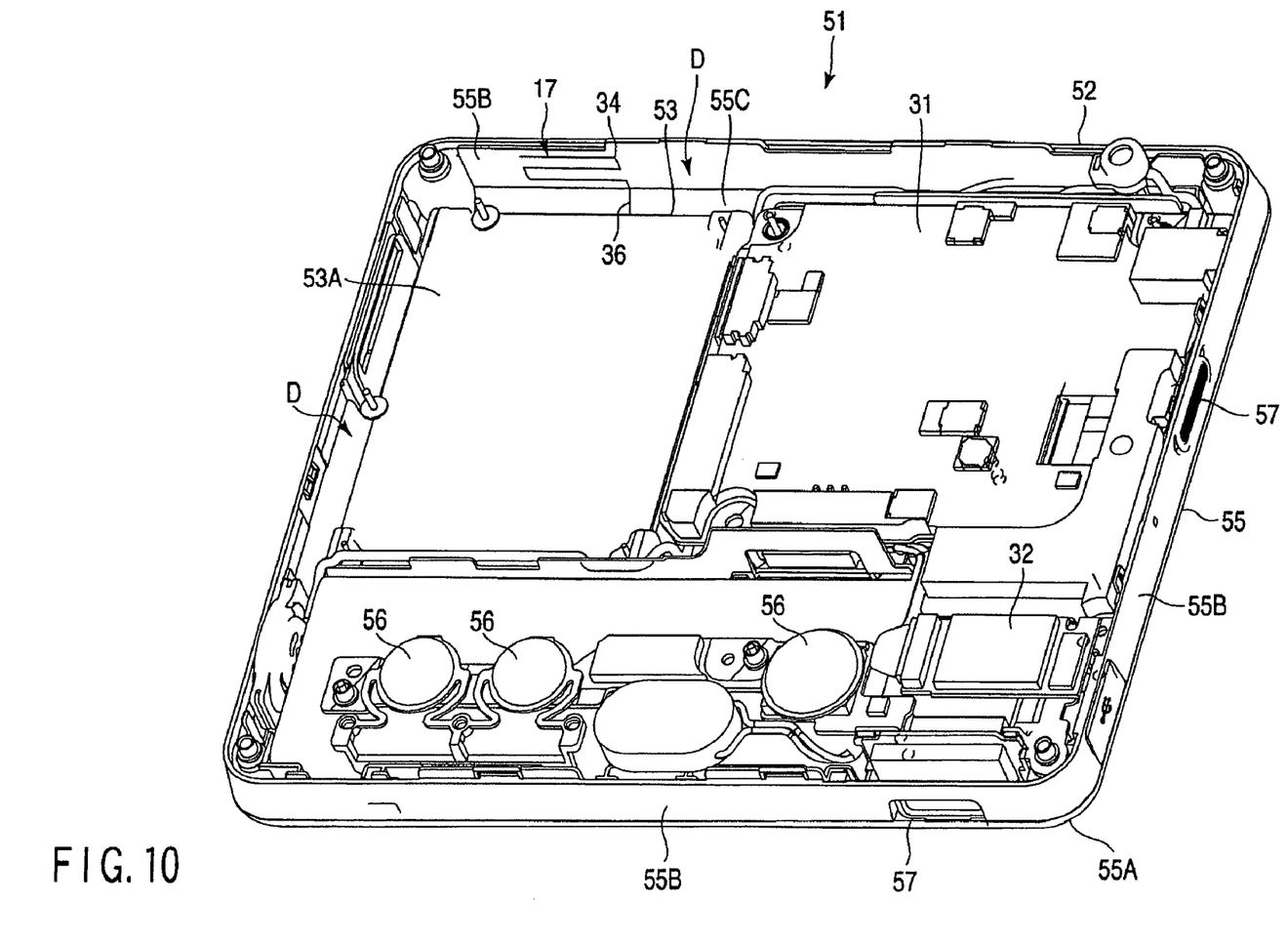
FIG. 10 is a perspective view useful in explaining the internal structure of the portable computer shown in FIG. 9.
Figure 11:
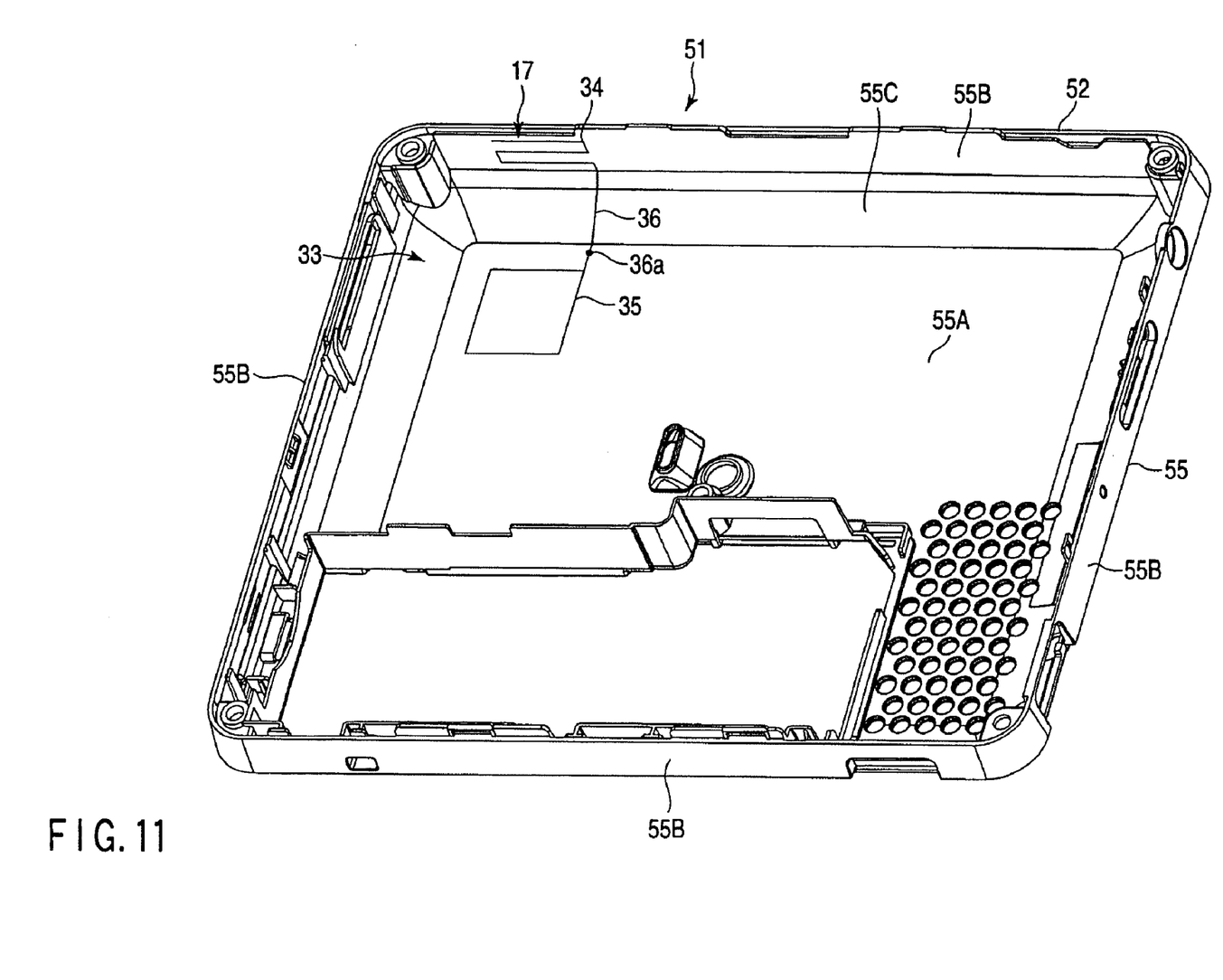
FIG. 11 is a perspective view illustrating a state in which an antenna is formed on the inner surface of the housing of the portable computer shown in FIG. 9.

Referring then to FIGS. 9 to 11, an electronic apparatus according to a second embodiment will be described. A portable computer 51 as an example of the electronic apparatus of the second embodiment differs from the first embodiment in that the former does not comprise a keyboard or display unit, but comprises only a main unit. In the second embodiment, elements similar to those of the first embodiment are denoted by corresponding reference numbers, and are not described in detail.

The portable computer 51 of the second embodiment is a so-called personal digital assistant (PDA). As shown in FIGS. 9 to 11, the portable computer 51 is formed only of a main unit, and includes a housing 52 as an outer envelope. The housing 52 of the portable computer 51 contains a liquid crystal display 16, a printed circuit board 31, a wireless module 32, a disk device 53, buttons 56 for inputting information to the computer 51, and a connector 57 for connecting the computer 51 to an external device. An antenna 17 is provided on the inner surface of the housing 52.

The housing 52 comprises a first component 54 (second case) and a second component 55 (first case). The first component 54 includes a frame-shaped top wall 54A, and a downward extension 54B downwardly extending from the top wall 54A. The second component 55 includes a rectangular bottom wall 55A opposing the top wall 54A, side walls 55B upwardly extending from the periphery of the bottom wall 55A, and an oblique wall 55C obliquely extending from the bottom wall 55A between the bottom wall 55A and one of the side wall 55B. The first and second components 54 and 55 can be detached from each other. The housing 52 is formed of, for example, a synthetic resin.

The antenna 17 is formed of a metal thin film and provided on the inner surface of the second component 55. The antenna 17 comprises an antenna element for mainly transmitting/receiving electromagnetic radiation, an antenna ground 35 installed to mainly broaden a radio frequency band, and a conductor portion 36 connecting the antenna element 34 to the antenna ground 35.

The antenna element 34, the antenna ground 35 and the conductor portion 36 are formed of copper, nickel and gold thin films stacked on each other by screen printing. The stacked structure has a thickness of, for example, 20 μm. The antenna element 34 is provided on the inner surface of one of the side walls 55B. The antenna ground 35 is provided on the inner surface of the bottom wall 55A. The conductor portion 36 is provided on the inner surfaces of the oblique wall 55C and the bottom wall 55A.

A wiring line is connected to the conductor portion 36 via the aforementioned feed terminal 40. The wiring line connects the power feed point 36a of the conductor portion 36 to the wireless module 32.

The disk device 53 is, for example, a hard disk device that can read and write data to and from a disk-shaped recording medium contained therein. The disk device 53 includes a metal shield case 53A that shields the disk device from external electromagnetic radiation and also prevents electromagnetic radiation generated therein from leaking out to the outside.

A gap D is formed between the disk device 53 and side walls 55B of the housing 52. The disk drive 53 is not limited to the hard disk device, but may be a floppy (trademark) disk drive, or an optical disk device for recording and reproducing data to and from a CD or DVD.

In the second embodiment, the housing 52 contains the wireless module 32, a display 16, and a component of a radiation absorbing property. The component of a radiation absorbing property is the disk device 53 for reading and writing data from and to a disk-shaped recording medium. In this structure, a gap D can be defined between the antenna element 34 provided on one of the side walls 55B of the housing 52 and the disk device 53, thereby preventing the disk device 53 from adversely affecting wireless communication made through the antenna 17. Further, since the antenna 17 is formed thin by printing, it does not require a large installation space, therefore the portable computer 51 can be formed compact.

As described above, in the second embodiment, the housing 52 comprises the first component 54 including the top wall 54A, and the second component 55 including the bottom wall 55A opposing the top wall 54A, and the side walls 55B. In this structure, the antenna 17 can be formed at a time by executing printing only on the second component 55 of the housing 52. Thus, the process of forming the antenna 17 can be simplified.

The second embodiment also incorporates a feed structure for the antenna 17, which comprises the feed terminal 40, the printed circuit board 41, the bosses 43, the screws 45 and the support walls 46 and 47, as in the first embodiment. Accordingly, the second embodiment can provide the same advantage as the first embodiment. Namely, the pressure of contact of the feed pin 42 against the conductor portion 36 can be appropriately controlled and stabilized at a desired value. Further, also in the second embodiment, the feed point 36a of the antenna 17 is located near the side wall 55B, whereby deformation of the housing at the feed point 36a can be suppressed to thereby minimize abrasion of the antenna 17.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For instance, although in the above-described embodiments, the present invention is applied to a portable notebook computer or PDA, the invention is not limited to this, but may be applied to a cellular phone.

What is claimed is:

1. An electronic apparatus comprising:
   a first case including a bottom wall, and a side wall provided at a periphery of the bottom wall;
   an antenna element formed of a metal thin film and provided on an inner surface of the side wall;
   an antenna ground formed of a metal thin film and provided near the antenna element on an inner surface of the bottom wall;
   a conductor portion formed of a metal thin film, provided on the inner surface of the bottom wall, and connecting the antenna element to the antenna ground;
   a wireless module which comprises a feed terminal electrically connecting to the conductor portion and feeds power to the antenna element;
   a circuit board which has the feed terminal of the wireless module mounted therein; and
   a fixing member which fixes the circuit board in a state of being opposed to the inner surface of the bottom wall, on the bottom wall in a cantilever state, on a side farther from the side wall than the feed terminal, so as to keep the feed terminal in pressure contact with the conductor portion.

2. The electronic apparatus of claim 1, wherein the feed terminal includes a feed pin conductive with the conductor portion, and a holding sleeve fixed to the circuit board and holding the feed pin such that the feed pin can project and retract, the holding sleeve urging the feed pin to be pressed against the conductor portion.

3. The electronic apparatus of claim 2, further comprising a first support member interposed between the bottom wall and the circuit board and between the feed terminal and the fixing member, the first support member including an end kept in contact with the bottom wall, and another end kept in contact with the circuit board.

4. The electronic apparatus of claim 3, wherein the first support member is located along a plane direction of the bottom wall, at a position at which a pressure of contact of the feed pin against the conductor portion can be set at an appropriate value.

5. The electronic apparatus of claim 4, further comprising:
- a second case kept in contact with an upper end of the side wall and opposing the bottom wall; and
- a second support member kept in contact with a surface of the circuit board opposite to a surface thereof with which the first support member is in contact, the second support member being also kept in contact with an inner surface of the second case.

6. An electronic apparatus comprising:
- a first case including a bottom wall, and a side wall provided at a periphery of the bottom wall;
- an antenna element formed of a metal thin film and provided on an inner surface of the side wall;
- an antenna ground formed of a metal thin film and provided near the antenna element on an inner surface of the bottom wall;
- a conductor portion formed of a metal thin film, provided on the inner surface of the bottom wall, and connecting the antenna element to the antenna ground;
- a wireless module which comprises a feed terminal electrically connecting to the conductor portion and feeds power to the antenna element; and
- a circuit board having a surface which is opposed to the bottom wall and on which the feed terminal is mounted, the circuit board fixed on the bottom wall at a position farther from the side wall than the feed terminal, so as to keep the feed terminal in pressure contact with the conductor portion.

\* \* \* \* \*